(12) United States Patent
Hiles

(10) Patent No.: US 7,052,057 B2
(45) Date of Patent: May 30, 2006

(54) DEVICE FOR HOOKING AND DRAGGING A GAME ANIMAL

(76) Inventor: Andrew M. Hiles, 97 Honeyerest Dr., Berkeley Springs, WV (US) 25411

( * ) Notice: Subject to any disclaimer, the term of this patent is extended or adjusted under 35 U.S.C. 154(b) by 0 days.

(21) Appl. No.: 10/686,857

(22) Filed: Oct. 16, 2003

(65) Prior Publication Data

US 2004/0090076 A1    May 13, 2004

Related U.S. Application Data

(60) Provisional application No. 60/421,158, filed on Oct. 24, 2002.

(51) Int. Cl.
  *B65G 7/12*    (2006.01)
  *A01M 31/00*   (2006.01)

(52) U.S. Cl. .......................... 294/26; 294/142; 452/187

(58) Field of Classification Search .................. 294/26, 294/142, 149, 153, 158, 166; 452/152, 187–190, 452/192; 43/5, 43.16; 16/87.2; 24/68 CD, 24/300, 302; D8/370, 372

See application file for complete search history.

(56) References Cited

U.S. PATENT DOCUMENTS

| | | | |
|---|---|---|---|
| 937,564 A * | 10/1909 | Autenrieth | 294/26 |
| 1,007,019 A * | 10/1911 | Wright | 294/26 |
| 1,065,383 A * | 6/1913 | Miller | 294/26 |
| 2,307,327 A * | 1/1943 | Lutz | 452/187 |
| 2,353,850 A * | 7/1944 | Roberts | 294/26 |
| 2,541,449 A * | 2/1951 | Vickers | 294/158 |
| 4,094,391 A * | 6/1978 | Ratchford | 294/158 |
| 4,696,505 A * | 9/1987 | Shadoan | 294/153 |
| 5,382,064 A | 1/1995 | Blais | |
| 5,448,805 A * | 9/1995 | Allen et al. | 24/300 |
| 6,142,547 A | 11/2000 | Bowerman | |
| 6,250,699 B1 * | 6/2001 | Robertson | 294/153 |
| 6,422,521 B1 * | 7/2002 | Tinklepaugh et al. | 24/300 |
| 2003/0036345 A1 * | 2/2003 | Conner | 452/187 |

* cited by examiner

*Primary Examiner*—Eileen D. Lillis
*Assistant Examiner*—Paul T. Chin
(74) *Attorney, Agent, or Firm*—Irving M. Weiner; Pamela S. Burt; Weiner & Burt, P.C.

(57) ABSTRACT

A device for hooking, dragging, or gaffing a game or marine animal. The device comprises a substantially triangular hook member having an opening and a sharp end for hooking the animal. When dragging the animal, the device distributes the weight to ground requiring little or no lifting.

3 Claims, 2 Drawing Sheets

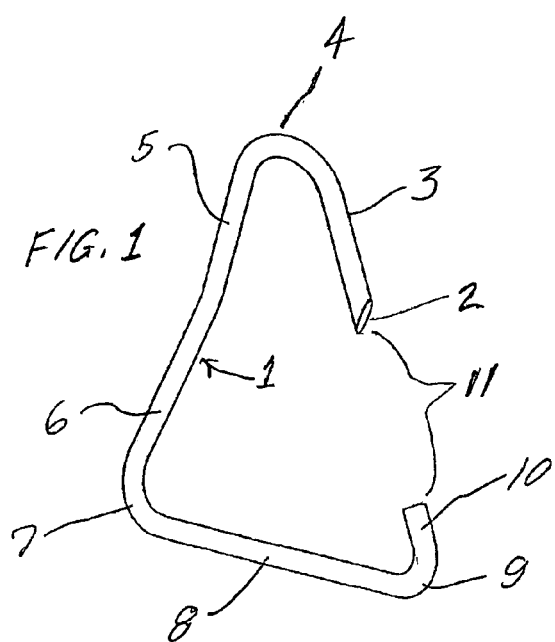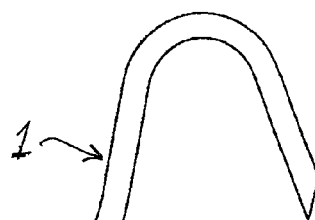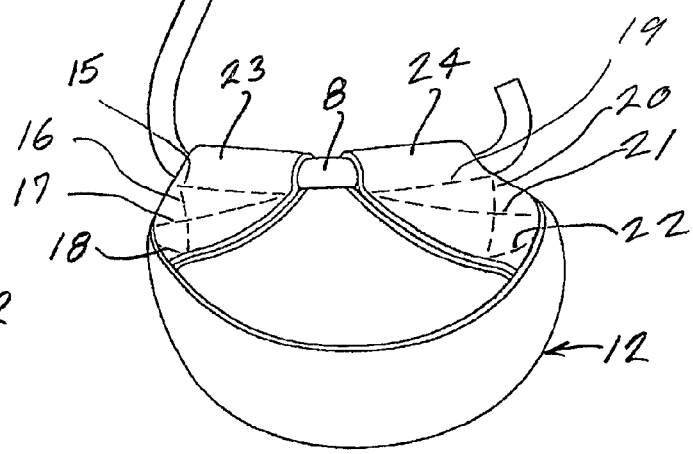

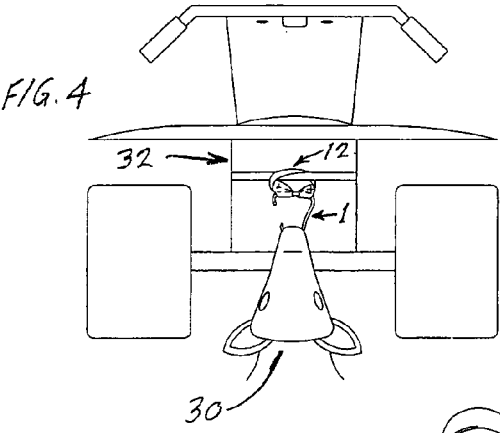
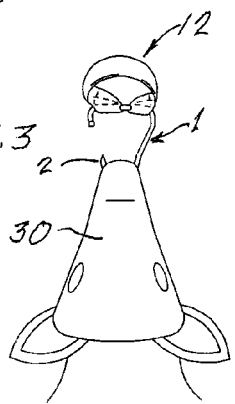
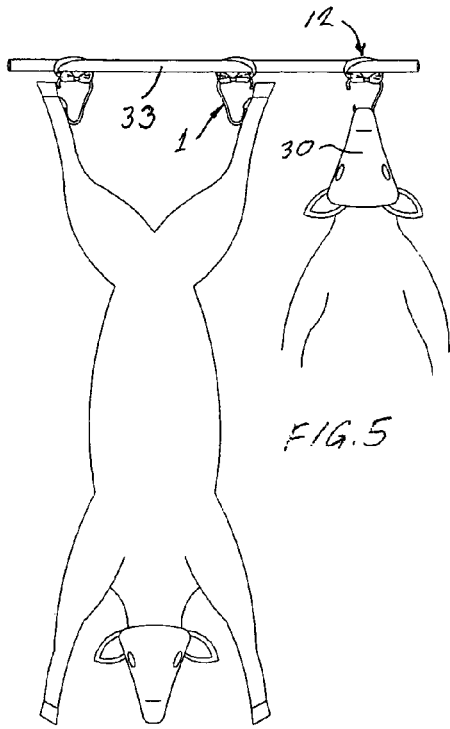
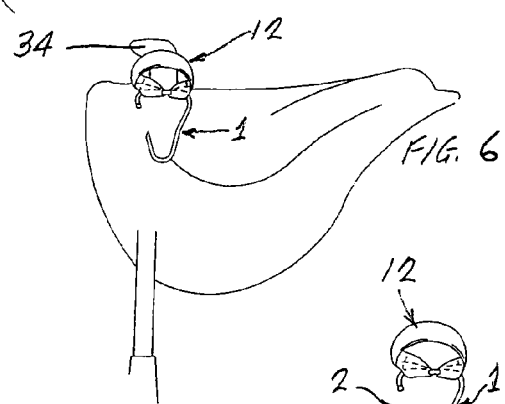

DEVICE FOR HOOKING AND DRAGGING A GAME ANIMAL

The present patent application claims priority from and is a continuation in part of U.S. Provisional Patent Application Ser. No. 60,421,158 filed Oct. 24, 2002.

The present invention relates generally to a novel and unique dragging and gaffing device.

More particularly, the present invention relates to a device for dragging game animals, such as deer, elk, bear, goats, hogs, etc., and for gaffing large fish.

BACKGROUND OF THE INVENTION

There is a need to provide the big game hunter and/or angler with a portable and comfortable dragging and/or gaffing device, which permits for comfortable one-man pulling and/or gaffing of the game or large fish.

The prior, but not necessarily relevant, art is exemplified by: Blais U.S. Pat. No. 5,382,064; Bowerman U.S. Pat. No. 6,142,547; and Robertson U.S. Pat. No. 6,250,699.

It is a desiradatum of the present invention to provide the novel and unique dragging and gaffing device mentioned hereinabove, while avoiding the animadversions of the existing devices and techniques.

SUMMARY OF THE INVENTION

The present invention provides a dragging and gaffing device for dragging a game animal and for gaffing a fish or marine animal, comprising: a hook member configured in a predetermined shape having a tapered end portion and a second end portion; said hook member is provided with a predetermined opening between said tapered end portion and said second end portion; a strap member operably connectable to said hook member so that said strap member serves as a handle and an attachment to connect said hook member to an external pulling mechanism; and said device distributes the weight of said game animal or said fish or marine animal to ground requiring little or no lifting.

The present invention provides a novel dragging and gaffing device comprising a hook member configured in a predetermined pattern, and a strap member which serves as a handle and also as an attachment to connect the hook portion to an ATV or other pulling mechanism.

It is a primary object of the present invention to provide a novel dragging and gaffing device as mentioned hereinabove, which is designed and engineered to provide a comfortable dragging mechanism.

A further object of the invention is to provide a dragging and gaffing device which permits one man to pull from the head of the game or large fish, and not from the hind legs or hind portion thereof.

An additional object is to provide such a dragging and gaffing device which can be used on game with or without horns.

Yet a further object of the invention is to provide a dragging and gaffing device as mentioned hereinabove, which distributes the weight to ground requiring little or no lifting.

A further object of the present invention is to provide a dragging and gaffing device as mentioned above, which device is of stainless steel construction and includes an additional wrist strap for increasing comfort.

Another object of the present invention is to provide a dragging and gaffing device as mentioned above which comprises a multi-functional carefree tool.

An additional object of the invention is to provide a dragging and gaffing device as described above, wherein the strap member serves as a handle, an attachment to connect the hook member to an ATV, an attachment to connect the hook member to a meat pole for hanging game, and as an attachment for attaching the hook member to a saddle horn for packing out meat.

The foregoing features and advantages of the present invention will become more apparent to those persons skilled in this particular area of technology and to others after having read the following detailed description in conjunction with the attached drawings.

BRIEF DESCRIPTION OF THE DRAWINGS

FIG. 1 illustrates a perspective view of the hook member in accordance with a preferred embodiment of the present invention.

FIG. 2 depicts the strap member secured to the hook member of FIG. 1.

FIG. 3 shows the embodiment of FIGS. 1 and 2 with the tapered end portion of the hook member passed through the flesh of the nostril of an animal.

FIG. 4 shows the arrangement of FIG. 3 with the strap member serving as an attachment to connect the hook member to an ATV.

FIG. 5 shows the strap member as an attachment to attach the hook member to a meat pole to hang the animals thereon.

FIG. 6 shows how the device can be used as an attachment for attaching the hook member to a saddle horn.

FIG. 7 shows how the device is used to gaff a fish.

DETAILED DESCRIPTION

With reference to FIG. 1, there is shown the hook member 1 in accordance with the preferred embodiment of the present invention. The hook member 1 may be fabricated from any suitable material. Preferably, but not necessarily, the hook member 1 may be fabricated from ⅜ inch diameter stainless steel, which is fabricated to form a unique predetermined configuration.

The hook member 1 comprises a sharp or tapered end portion 2 at the end of a hook portion 3 leading to a corner portion 4, which in turn is connected to a hook portion 5, connected to a hook portion 6 extending to a handle corner portion 7 that is connected to a handle portion 8, extending to a handle corner portion 9, which in turn is connected to an end portion 10.

Preferably, but not necessarily, the sharp or tapered end portion 2 has a tapered end in the range of a 30° to 45° taper.

It should also be noted that there is a predetermined angle between hook portion 5 and hook portion 6.

Preferably, but not necessarily, the hook member is formed from a 13-inch long stainless steel rod having a ⅜ inch diameter. As such, the approximate distance between corner portions 4 and 7 is 5 inches; and the approximate distance between handle corner portions 7 and 9 is 4⅜ inches.

It is important to note that there is provided a predetermined opening 11 between the tapered end portion 2 and the end portion 10.

With reference to FIG. 2, there is shown the strap member 12, which preferably, but not necessarily, is fabricated from nylon. The end portions of the strap webbing are folded back and sewn at 15, 16, 17, 18, 19, 20, 21 and 22 to provide loops 23 and 24 in the end of the webbing for insertion therethrough of the handle portion 8 of the hook member 1.

Preferably, but not necessarily, the strap member 12 is fabricated from a webbing which is approximately 21-inches in length, and approximately 2-inches in width. The stitching portions 15, 16, 17, 18, 19, 20, 21 and 22 aid in forming the two loops 23 and 24 to accommodate the passage therethrough of the handle portion 8 of the hook member 1.

The tapered end portion 2 of the hook member 1 may be passed through the flesh of the nostril of the game 30 (as shown in FIG. 3) or large fish 31 (as shown in FIG. 8), or on heavier game, in the roof of the mouth up through the cartilage of the game.

The nylon strap member 12 acts as a handle, and also as an attachment to connect the hook member 1 to an ATV 32 (as shown in FIG. 4), and also to attach the hook member 1 to a meat pole 33 to hang the game thereon (as shown in FIG. 5), and also for attaching the hook member 1 to a saddle horn 34 for packing out meat (as shown in FIG. 7).

It should be noted that the foregoing description is for illustrative purposes only, and not for limiting the scope of the present invention. It should be understood, that various modifications will occur to those persons skilled in this particular area of technology and to others without departing from the scope of the present invention.

The invention claimed is:

1. A device for hooking and dragging a game animal, fish or marine animal, comprising:

a one-piece unitary rigid hook member configured in a shape having five straight side portions;

said five straight side portions comprising a first hook portion, a second hook portion, a third hook portion, a handle portion, and a second end portion said hook member comprises a sharp end portion at an end of the first hook portion connected to an apex corner portion, which in turn is connected to the second hook portion, which in turn is connected to the third hook portion extending to a first handle corner portion that is connected to the handle portion extending to a second handle corner portion, which in turn is connected to said the second end portion;

said hook member is provided with a fixed predetermined opening between said sharp end portion and said second end portion;

said sharp end portion has a tapered end in the range of 30° to 45° taper for piercing said game animal, fish or marine animal thereto;

there is provided a predetermined angle between said second hook portion and said third hook portion;

said apex corner portion is disposed opposite to and remote from said handle portion;

a strap member including a strap webbing, the end portions of which are folded back and secured at various portions to provide two loops in said strap webbing for insertion therethrough of said handle portion of said hook member;

a first one of said two loops being disposed at a first one of said end portions of said webbing;

a second one of said two loops being disposed at a second end of said end portions of said strap webbing; and said handle portion being disposed within said two loops and bearing against said two loops to distribute equally the weight of said game animal, fish or marine animal to said strap member.

2. The device according to claim 1, wherein:

said strap member functions as a handle, or as an attachment to connect said hook member to an all terrain vehicle, or as an attachment to connect said hook member to a meat pole for hanging said game animal or said fish or marine animal, or as an attachment for attaching said hook member to a saddle horn for packing out meat of said game animal or said fish or marine animal.

3. The device according to claim 1, wherein:

said strap member is operably connectable to said hook member so that said strap member functions as a handle, or a connection attachment, or as a wrist strap to facilitate dragging or hanging said hook member when hooked to said game animal, fish or marine animal.

* * * * *